Figure 1:
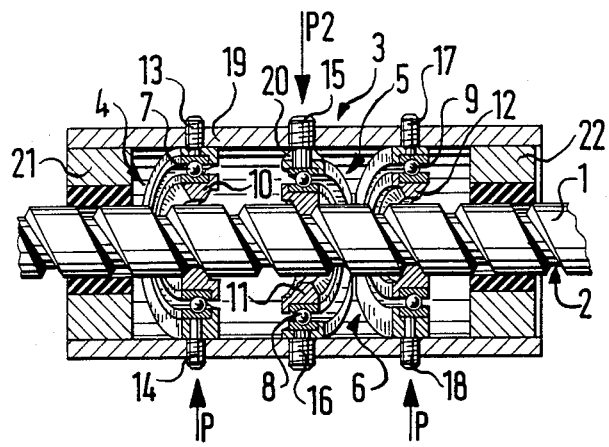

United States Patent [19]

Gärtner

[11] Patent Number: 4,856,356

[45] Date of Patent: Aug. 15, 1989

[54] SCREW JACK

[76] Inventor: Robert Gärtner, Freiherr-vom-Stein-Str. 8, 6308 Butzbach, Fed. Rep. of Germany

[21] Appl. No.: 50,882

[22] Filed: May 18, 1987

[30] Foreign Application Priority Data

May 20, 1986 [DE] Fed. Rep. of Germany ....... 3616905

[51] Int. Cl.⁴ .............................................. F16H 25/22
[52] U.S. Cl. .................................. 74/25; 74/424.8 R
[58] Field of Search .................. 74/424.8 R, 89.15, 25

[56] References Cited

U.S. PATENT DOCUMENTS

| | | | |
|---|---|---|---|
| 2,482,082 | 9/1949 | Wahlberg | 74/459 |
| 2,940,322 | 6/1960 | Uhing | 74/22 |
| 3,698,258 | 10/1972 | Gartner | 74/424.8 R |
| 3,937,089 | 2/1976 | Gartner | 74/25 |
| 3,977,258 | 8/1976 | Bauer | 74/25 |
| 4,222,619 | 9/1980 | Nilsson | 74/25 |
| 4,253,342 | 3/1981 | Uhing | 74/89 |
| 4,322,987 | 4/1982 | Gartner | 74/424.8 R |
| 4,450,731 | 5/1984 | Wardley | 74/25 |
| 4,557,432 | 12/1985 | Ito | 74/22 R |
| 4,573,367 | 3/1986 | Uhing | 74/89 |

FOREIGN PATENT DOCUMENTS

| | | | |
|---|---|---|---|
| 2327213 | 12/1974 | Fed. Rep. of Germany | 74/424.8 R |
| 2725054 | 12/1978 | Fed. Rep. of Germany | 74/424.8 R |
| 2839920 | 3/1980 | Fed. Rep. of Germany | . |
| 3225495 | 1/1984 | Fed. Rep. of Germany | 74/424.8 R |
| 1309305 | 9/1984 | Fed. Rep. of Germany | . |
| 3417056 | 11/1985 | Fed. Rep. of Germany | 74/459 |
| 3502775 | 11/1985 | Fed. Rep. of Germany | 74/89 |
| 3434520 | 3/1986 | Fed. Rep. of Germany | 74/424.8 R |
| 2839920 | 10/1986 | Fed. Rep. of Germany | . |

Primary Examiner—Leslie A. Braun
Assistant Examiner—Scott Anchell
Attorney, Agent, or Firm—Wegner & Bretschneider

[57] ABSTRACT

The nut structure (3) of a screw jack has ball bearing units (4, 5, 6) the middle one (5) of which engages from one side and the two outer ball bearing units (4, 6) engage from the opposite side on the same plane of action into the thread (2). Thus the nut structure (3) is supported against the screw shaft (1) without tilting moments so that no neck bearing is needed. As a result the screw jack works with extremely little friction and with extremely little tendency to vibrate.

10 Claims, 8 Drawing Sheets

SCREW JACK

BACKGROUND OF THE INVENTION

The invention relates to a screw jack with a screw shaft and several ball bearing units that surround the screw eccentrically and form a nut structure, the ball bearing units engaging unilaterally into the thread and rolling in the thread and forming one part with or being joined to an inner track ring of one ball bearing unit, the outer rings of the ball bearings of the individual ball bearing units being joined with each other. Such a screw jack is described in DE-OS No. 27 25 054.

The screw jack already known has two ball bearing units in the nut structure which engage with radial pre-load from opposite sides into the thread. Since the ball bearing units are necessarily arranged sideways at a distance from each other, the radial pre-load causes a tilting moment effecting the nut structure, which is balanced by a neck bearing that also engages in the thread. This is a disadvantage with regard to the efficiency, the smoothness of running, the long life and the idling moment, particularly if the length of the screw shaft is big compared to the diameter of the screw. A rather high stress is often also caused by an improper adjustment of the ball bearing units. Such wrong adjustments are mostly only recognized by bad running and an increased wear of the neck bearings.

Attempts have been made to diminish the negative influence of the tilting moment caused by the two ball bearing units by using a ball bearing as the neck bearing. However, it turned out that such bearings did not offer a satisfactory solution in case of high stress, especially during non-vibrating working at high rotational speed.

The object of the invention is to develop a screw jack as mentioned before in such a way that an optimal functioning, in particular a very smooth running with little friction, is reached even under unfavorable conditions.

This object is achieved by providing at least three ball bearing units that engage with the thread whereby the points of engagement into the thread are all within a plane of action that is lying in the longitudinal direction of the screw shaft. At least one ball bearing unit engages at a point 180 opposed to that of the other ball bearing units, the nut structure being supported at the screw shaft solely by these points of engagement of the ball bearing units.

In such a screw jack the moments and forces caused by the radial forces of the ball bearing units compensate each other. Thus a neck bearing which supports itself on the screw shaft becomes unnecessary and consequently the screw jack can work with extremely little friction and vibration. Thanks to the arrangement according to the invention such a screw jack that necessarily works without clearance is especially adapted for high rotational speed.

The kind of ball bearings that are used is not important for the invention. One can use a variety of different arrangements of bearings (x-arrangement, O-arrangement, tandem-arrangement) to realise the invention. It is also possible to combine an axial bearing with a radial bearing to form the ball bearing unit. Such a ball bearing unit would be very small.

The screw jack is constructed in a particularly simple way if there are altogether three ball bearing units, the middle one of which engages from one side of the screw shaft into the thread and the other two engage from the opposite side of the screw shaft into the thread. Since the middle one of the ball bearing units is loaded twice as much as the two outer ball bearing units it is advisable to use a stronger ball bearing for this ball bearing unit.

In case especially high axial forces are to be transmitted it is advisable according to another embodiment of the invention to provide a total of four ball bearing units, the two middle ones of which engage from one side of the screw shaft into the thread and the two outer ones engage from the opposite side of the screw shaft into the thread. Compared to the embodiment with only three ball bearing units this embodiment has the advantage that one of the ball bearing units no longer has to cause double as much pre-load as the other ones.

If the nut structure has a rigid casing the radial pre-load of the ball bearing units can be caused simply by providing a spring which supports itself on the one hand on the middle one or ones of the ball bearing units and on the other hand on the connection of the outer rings of all ball bearing units.

The nut structure, however, does not need any separate springs at all if the outer rings are connected by at least one longitudinal member made of hardened spring steel which presses the ball bearing units as their point of engagement into the thread.

It is also advantageous in case of four or more ball bearing units that all have nearly the same radial pre-load and so nearly the same pressing force at their relevant point of engagement. Thus all ball bearing units are loaded equally so that they can be dimensioned equally.

If especially high forces are to be expected from the side that do not run in direction of the points of engagement it is advantageous according to another embodiment of the invention to provide several nut structures as described before which in view of their radial pre-load are arranged in different angular positions to each other.

The nut structure does not need a casing if it is made up of only the ball bearing units and at least one longitudinal member that joins the outer rings of the ball bearing units to each other.

According to another embodiment of the invention, the—; screw jack is adapted to transfer particularly high axial forces if, symmetrically to a line that leads radially through the screw, four ball bearing units are arranged equidistant from each other and engage in one side of the screw, and if on the opposite side two further ball bearing units engage the screw in the same plane of action on both sides of the radial line and at the same distance to it.

In a screw jack with a larger number of ball bearing units the forces on the ball bearings are nearly made equal if the ball bearing units next to each other on one side of engagement are supported on this side by a balance beam against the casing of the nut structure.

The pre-load of the individual ball bearing units can be adjusted without influencing the other ball bearing units if each ball bearing unit is fixed to at least one spring bridge that is mounted on the nut structure crosswise to the screw shaft.

Figure 2:
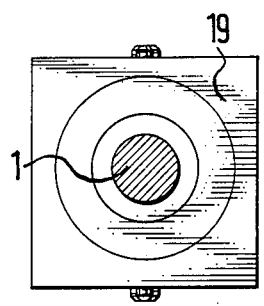
Figure 3:
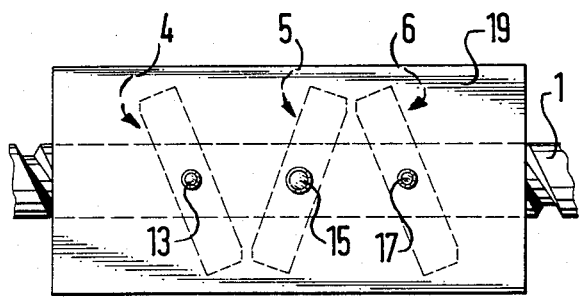
Figure 4:
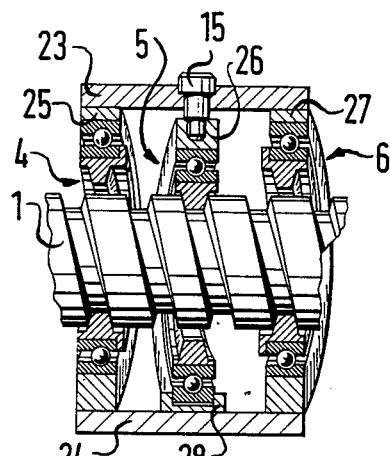
Figure 5:
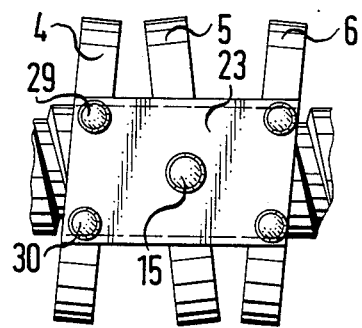
Figure 6:
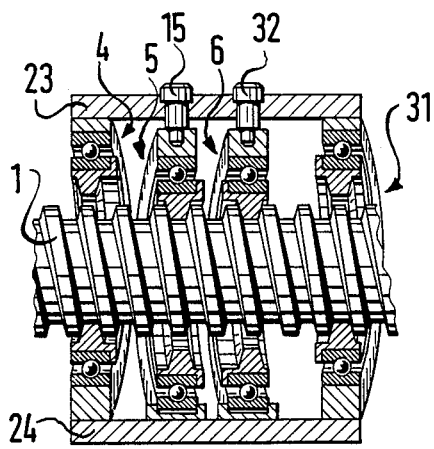
Figure 7:
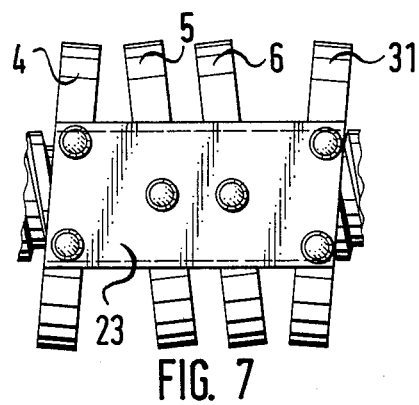
Figure 8:
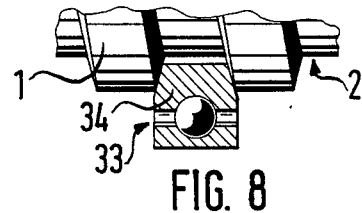
Figure 9:
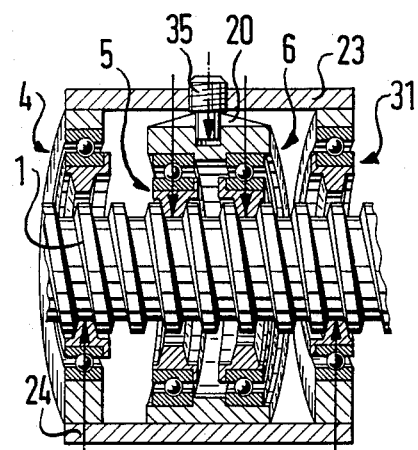
Figure 10:
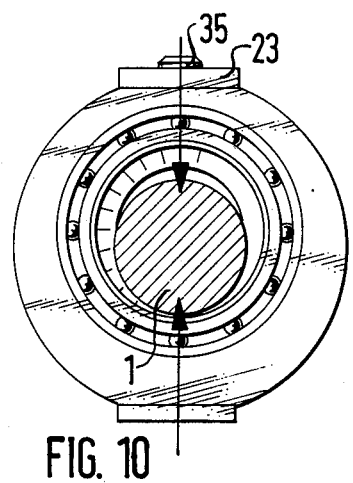
Figure 11:
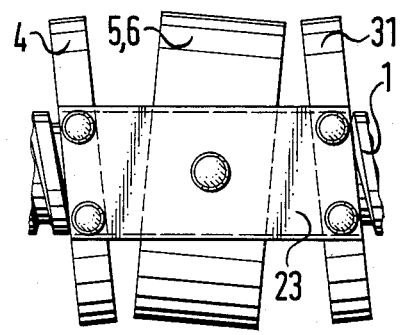
Figure 12:
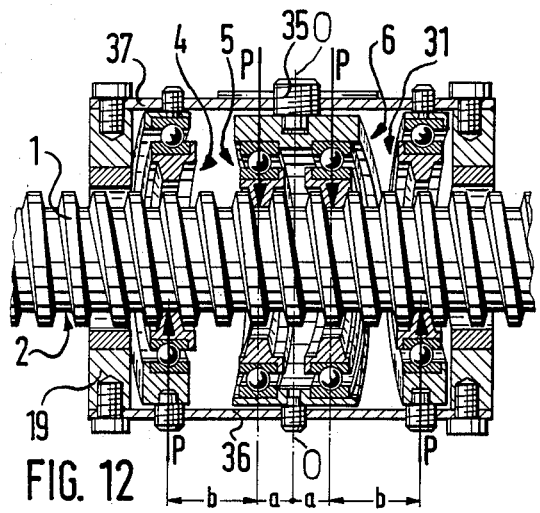
Figure 13:
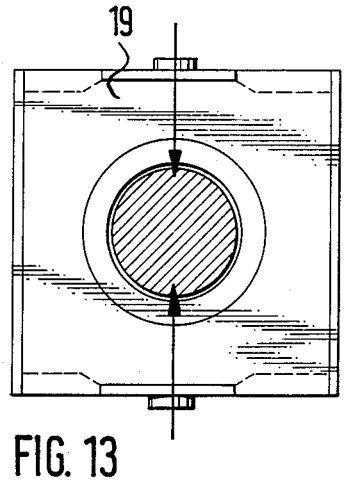
Figure 14:
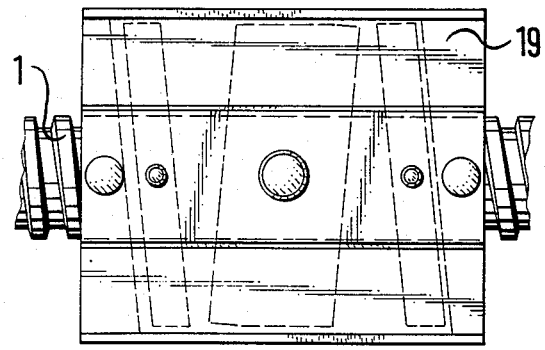
Figure 15:
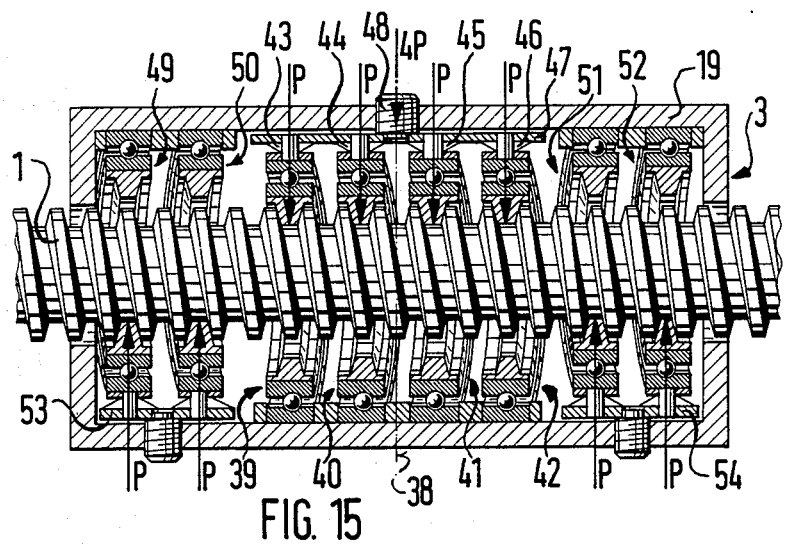
Figure 16:
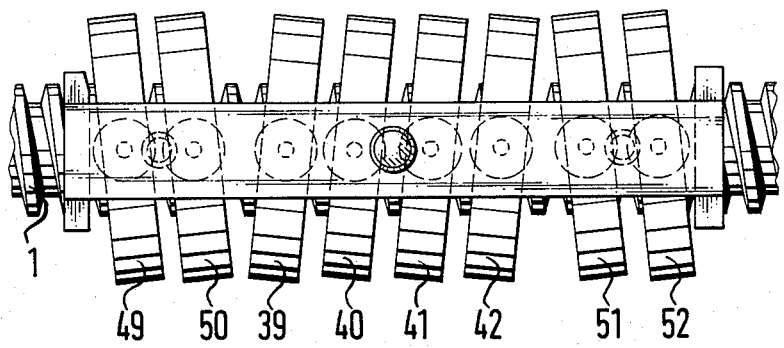
Figure 17:
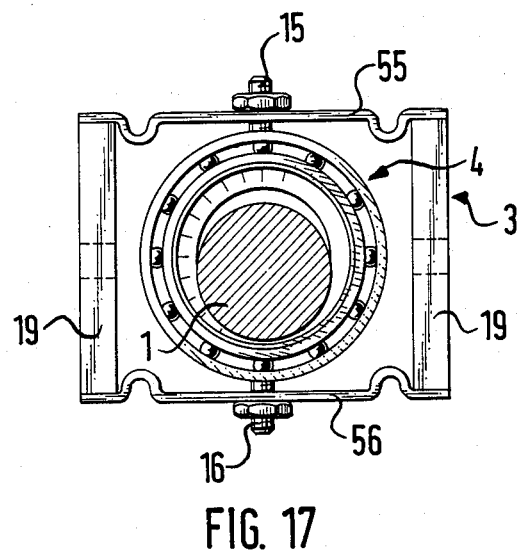
Figure 18:
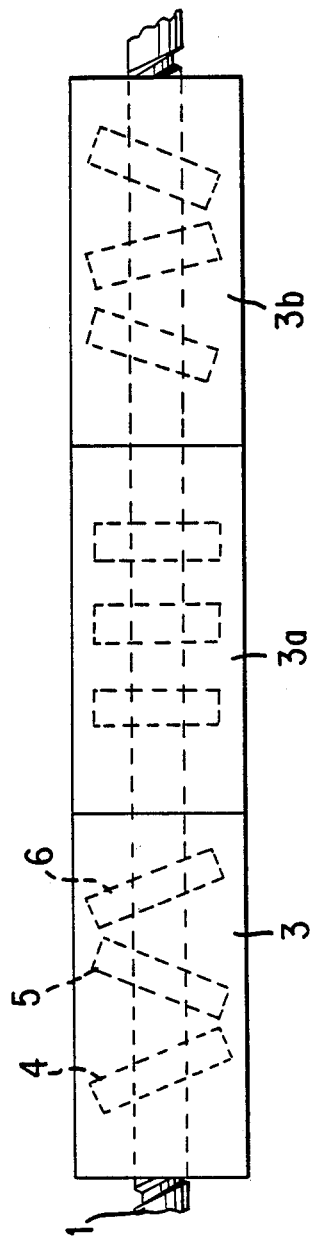

The invention permits of numerous modifications. For further clarification some of them are shown in the drawings and are described below. In the drawings FIG. 1 shows a longitudinal section through a first embodiment of a screw jack with three ball bearing units, FIG. 2 shows a side view of the screw jack according to FIG. 1, FIG. 3 shows a view from above on the screw jack according to FIGS. 1 and 2, FIG. 4 shows a longitudinal section through a second embodiment of a screw jack with three ball bearing units, FIG. 5 shows a view from above on the screw jack according to FIG. 4, FIG. 6 shows a longitudinal section through a screw jack according to the invention with four ball bearing units, FIG. 7 shows a view from above on the screw jack according to FIG. 6, FIG. 8 shows a depiction in larger scale of the engagement of a ball bearing unit in the screw, FIG. 9 shows a longitudinal section through a further embodiment of a screw jack with four ball bearing units, FIG. 10 shows a view from the side on the screw jack according to FIG. 9, FIG. 11 shows a view from above on the screw jack according to FIGS. 9 and 10, FIG. 12 shows a longitudinal section through a further embodiment of a screw jack with four ball bearing units, FIG. 13 shows a view from the side on the screw jack according to FIG. 12, FIG. 14 shows a view from above on the screw jack according to FIGS. 12 and 13, FIG. 15 shows a longitudinal section through a screw jack with totally eight ball bearing units, FIG. 16 shows a view from above on the screw jack according to FIG. 15, FIG. 17 shows a view from the side on a further embodiment of a screw jack according to the invention, FIG. 18 shows a top view similar to FIG. 3, showing three nut structures arranged to provide pre-load in different angular directions.

FIG. 1 shows a part of a screw shaft 1 with a thread 2. On this screw shaft 1 there is a nut structure 3 which engages into the thread with altogether three ball bearing units 4, 5, 6 that are arranged eccentrically to the screw shaft. Each of the ball bearing units 4, 5, 6 has a ball bearing 7, 8, 9 and a support ring 10, 11, 12. The support rings 10, 11, 12 are constructed to engage into the thread 2. The two outer ball bearing units 4 and 6 are arranged slightly staggered towards the top compared to the longitudinal axis of the screw shaft 1 so that their support rings 10, 12 engage from the bottom with crest clearance into the thread 2. Contrary to this the middle ball bearing unit 5 is arranged staggered towards the bottom compared to the longitudinal axis of the screw shaft 1 and thus its support ring 11 engages from above with crest clearance into the thread 2. The points of engagement of the support rings 10, 11, 12 are in the same plane of engagement that runs in longitudinal direction of the screw shaft 1.

The ball bearing units 4, 5, 6 are each kept in a casing 19 of the nut structure 3 by two pins 13, 14; 15, 16; 17, 18; each set of pins being arranged opposite to each other. Thus the ball bearing units 4, 5, 6 can be inclined according to the pitch of the thread 2. On the pin 15 of the middle ball bearing unit 5 in the casing 19 there sits a spring 20 constructed as a Belleville spring that pre-loads the middle ball bearing unit 5 downwards as seen in the drawing and thus into the thread 2. The counter-force to the radial pre-load caused by spring 20 is solely caused by the two outer ball bearing units 4 and 6.

These are to be arranged at the same distance to the middle ball bearing unit 5. This leads to the result that if the middle ball bearing unit 5 has a pre-load of 2P, the two outer ball bearing units have a pre-load of P which has been indicated in the drawing. Therefore the forces and moments compensate for each other.

FIG. 1 also shows that at its two front ends the casing 19 has end walls 21, 22 which, however, are not functioning as neck bearings but are only meant to be sealing elements. Due to these end walls 21, 22 one has the possibility to fill the casing 19 with viscous grease.

FIG. 2 shows that the cross-section of casing 19 is square.

FIG. 3 shows how the ball bearing units 4, 5, 6 are inclined because of the pitch of the thread 2, the two outer ball bearing units 4 and 6 being inclined in opposite direction to the middle ball bearing unit 5 because they grip from the opposite side into the thread 2.

The embodiment according to FIGS. 4 and 5 differs from the former figures by having two longitudinal members 23, 24 instead of a rigid casing, at least one of which is made of spring steel. These longitudinal members 23, 24 connect, from opposite sides, the outer rings 25, 26, 27 with each other. The middle ball bearing unit 5 is again kept by the pin 15 in an inclined way that adjusts itself according to the pitch of the thread. the ball bearing unit 5 is held by the longitudinal member 24 in a groove that is slightly cambered of a mount 28 so that the desired self-adjustment is made possible.

The radial pre-load of the ball bearing units 4, 5, 6 in this embodiment results from the spring force of the longitudinal members 23, 24 or of the one longitudinal member 23. It can be adjusted by having the pin 15 made movable so that it is shifting the middle ball bearing unit 5 more or less radially to the screw shaft 1.

FIG. 5 shows that the two outer ball bearing units 4, 6 are fixed to the longitudinal member 23 and accordingly to the opposite longitudinal member 24 by two bolts 29, 30 each. This way the ball bearing units 4, 6 are fixed immovably to the longitudinal members 23, 24.

The embodiment according to FIGS. 6 and 7 basically corresponds to that of FIGS. 4 and 5. It only differs from the embodiment in that a total of four ball bearing units 4, 5, 6, 31 are employed. These are fixed to the longitudinal members 23, 24 exactly as mentioned before and, with the two ball bearing units 5, 6 in the middle being fixed by pins 15, 32 to the longitudinal member 23 in a self-adjusting manner.

FIG. 8 shows a special construction of a ball bearing 33 for the ball bearing units 4, 5, 6, 31. It can be seen that this ball bearing 33 has an inner ring 34 that is formed to the inside as a support ring and can therefore engage directly into the thread 2 of the screw shaft 1.

Contrary to the longitudinal members according to FIGS. 6 and 7, the longitudinal members 23, 24 in the embodiment according to FIGS. 9, 10, 11 are rigid. As in the embodiment according to FIG. 1 the radial pre-load of their ball bearing units 4, 5, 6, 31 is caused by a spring 20 that is sitting on a threaded stud 35 belonging to both ball bearing units 5, 6 and being beneath the longitudinal member 23. Thus the ball bearing units 5, 6 are pre-loaded downwards as seen from the drawing. By screwing the threaded stud 35 more or less deeply into the longitudinal member 23 the pre-load can be adjusted. The pre-laod must be so big that the axial forces acting upon the screw shaft 1 cannot press the ball bearing units 4, 5, 6, 31 radially out of the thread 2.

In the embodiment according to FIGS. 12, 13, 14 a rigid casing 19 is provided which holds the ball bearing units 4, 5, 6, 31. In the middle part of the upper and lower wall of the casing 19 there is a leaf spring 36, 37 each, the ball bearing units 4, 5, 6, 31 being fixed between these leaf springs. As in the embodiment mentioned before the threaded stud 35 of the two middle ball bearing units 4, 5 can be made adjustable so that the radial pre-load of all ball bearing units can be adjusted.

The facts that all four radial pre-loads are equal, namely P, and that the system has a minimum length of construction lead to the distances indicated in FIG. 12 of the ball bearing units 4, 5, 6, 31 from the vertical symmetry-line 0—0:

For the inner ball bearing units engaging from above:

$$a = n_{min} \cdot h$$

and for the outer ball bearing units engaging from below:

$$b = (m_{min} + 0,5) \cdot h$$

with h being the pitch of the thread. $n_{min}$ and $m_{min}$ are the smallest natural numbers that realize the construction by taking into account the pitch and width of the ball bearing units. It results positively from these two formulas that the forces are in one plane.

FIGS. 15 and 16 show a screw jack that is adapted for transmitting especially high forces. Symmetrically to a line 38 that runs cross-wise to the screw shaft 1 there are totally four ball bearing units 39, 40, 41, 42 that support against a balance beam 47 by means of a spring 43, 44, 45, 46 each that is a Belville spring, the balance beam 47 being held by a stud 48 in the casing 19 of the nut structure 3.

At both sides of the ball bearing units 39, 40, 41, 42 there are two further ball bearing units each 49, 50; 51, 52 that are arranged equidistant to the line 38. These ball bearing units 49, 50, 51, 52 cause the counterforces to the ball bearing units 39, 40, 41, 42 and are all equally loaded as indicated by arrows P. On the side of their point of engagement these two ball bearing units each 49, 50 and 51, 52 are also supported against the casing 19 by a balance beam 53, 54.

FIG. 17 shows a ball bearing unit 4 which gives an example of fixing the ball bearing units in the nut structure 3 in a different way from the embodiments mentioned before. One can see that the ball bearing unit 4 is held on the spring bridge 55, 56 by its pins 15, 16 each, the spring bridge 55, 56 running crosswise to the screw shaft 1. Each spring bridge 55, 56 which is screwed on both sides of the screw shaft 1 on the casing 19 of the nut structure 3 only holds one ball bearing unit 4. This way the radial pre-load of the individual ball bearing units of a nut structure 3 can be adjusted quite independently of each other.

FIG. 18 shows a screw jack having two additional nut structures 3a and 3b for supporting the screw shaft 1. The nut structures are oriented so that they provide pre-load in different angular directions. This arrangement is desirable if high forces are expected which are not in the direction of the points of engagement of a single nut structure.

What is claimed is:

1. A screw jack, comprising a threaded screw shaft and a nut structure, said nut structure comprising at least three ball bearing units which surround the screw shaft eccentrically, each ball bearing unit having an inner track ring which engages unilaterally into the threads of the screw shaft and rolls in the threads, and an outer ring, the outer rings of the ball bearing units being connected together;

wherein the screw shaft has a longitudinal axis and each ball bearing unit engages the threads of the screw shaft at a point of engagement, the points of engagement of the ball bearing units being within a common plane of action which is parallel to the longitudinal axis;

wherein the point of engagement of at least one ball bearing unit is disposed 180° opposite to the points of engagement of at least two other ball bearing units, said nut structure being supported against the screw shaft solely by the points of engagement of the ball bearing units;

wherein the outer rings of the ball bearing units are connected together by at least one longitudinal member made of hardened spring steel which presses the ball bearing units, at their points of engagement, into the threads of the screw shaft; and wherein the outer rings of two outer ball bearing units of said nut structure are fixed immovably relative to each other.

2. The screw jack as claimed in claim 1, wherein said nut structure comprises a total of three ball bearing units disposed along the screw shaft, the point of engagement of the middle ball bearing unit being disposed 180° opposite to the points of engagement of the two outer ball bearing units.

3. The screw jack as claimed in claim 1, wherein said nut structure comprises a total of four ball bearing units disposed along the screw shaft, the points of engagement of the middle two ball bearing units being disposed 180° opposite to the points of engagement of the two outer ball bearing units.

4. The screw jack as claimed in claim 1, further comprising a spring disposed between one of said ball bearing units and one of said at least one longitudinal member, said spring providing a pressing force of the ball bearing units against the screw shaft.

5. The screw jack as claimed in claim 1, wherein said nut structure comprises at least four ball bearing units, each of said ball bearing units having an essentially identical radial pre-load so as to provide an essentially identical pressing force at the points of engagement.

6. The screw jack as claimed in claim 1, wherein the nut structure consists of said ball bearing units and said at least one longitudinal member.

7. A screw jack, comprising a threaded screw shaft and a nut structure, said nut structure comprising at least three ball bearing units which surround the screw shaft eccentrically, each ball bearing unit having an inner track ring which engages unilaterally into the threads of the screw shaft and rolls in the threads, and an outer ring, the outer rings of the ball bearing units being connected together;

wherein the screw shaft has a longitudinal axis and each ball bearing unit engages the threads of the screw shaft at a point of engagement, the points of engagement of the ball bearing units being within a common plane of action which is parallel to the longitudinal axis;

wherein the point of engagement of at least one ball bearing unit is disposed 180° opposite to the points of engagement of at least two other ball bearing units, said nut structure being supported against the screw shaft solely by the points of engagement of the ball bearing units;

wherein the outer rings of the ball bearing units are connected together by at least one longitudinal member made of hardened spring steel which presses the ball bearing units, at their points of engagement, into the threads of the screw shaft; and wherein said screw jack comprises a plurality of nut structures, each of said nut structures providing a radial pre-load and being arranged so that the radial pre-load of the nut structures are provided at different angular positions.

8. A screw jack, comprising a threaded screw shaft and a nut structure, said nut structure comprising at least three ball bearing units which surround the screw shaft eccentrically, each ball bearing unit having an inner track ring which engages unilaterally into the threads of the screw shaft and rolls in the threads, and an outer ring, the outer rings of the ball bearing units being connected together;

wherein the screw shaft has a longitudinal axis and each ball bearing unit engages the threads of the screw shaft at a point of engagement, the points of engagement of the ball bearing units being within a common plane of action which is parallel to the longitudinal axis;

wherein the point of engagement of at least one ball bearing unit is disposed 180° opposite to the points of engagement of at least two other ball bearing units, said nut structure being supported against the screw shaft solely by the points of engagement of the ball bearing units;

wherein the outer rings of the ball bearing units are connected together by at least one longitudinal member made of hardened spring steel which presses the ball bearing units, at their points of engagement, into the threads of the screw shaft; and wherein said nut structure comprises eight ball bearing units, four ball bearing units being disposed symmetrically on either side of a line extending radially through the screw shaft, the points of engagement of the four middle ball bearing units being disposed on one side of the screw shaft, the points of engagement of the outer four ball bearing units being disposed on an opposing side of the screw shaft.

9. A screw jack, comprising a threaded screw shaft and a nut structure, said nut structure comprising at least three ball bearing units which surround the screw shaft eccentrically, each ball bearing unit having an inner track ring which engages unilaterally into the threads of the screw shaft and rolls in the threads, and an outer ring, the outer rings of the ball bearing units being connected together;

wherein the screw shaft has a longitudinal axis and each ball bearing unit engages the threads of the screw shaft at a point of engagement, the points of engagement of the ball bearing units being within a common plane of action which is parallel to the longitudinal axis;

wherein the point of engagement of at least one ball bearing unit is disposed 180° opposite to the points of engagement of at least two other ball bearing units, said nut structure being supported against the screw shaft solely by the points of engagement of the ball bearing units;

wherein said nut structure comprises eight ball bearing units, four ball bearing units being disposed symmetrically on either side of a line extending radially through the screw shaft, the points of engagement of the four middle ball bearing units being disposed on one side of the screw shaft, the points of engagement of the outer four ball bearing units being disposed on an opposing side of the screw shaft; and wherein the four middle ball bearing units are connected together by a balance beam connected to a casing.

10. A screw jack, comprising a threaded screw shaft and a nut structure, said nut structure comprising at least three ball bearing units which surround the screw shaft eccentrically, each ball bearing unit having an inner track ring which engages unilaterally into the threads of the screw shaft and rolls in the threads, and an outer ring, the outer rings of the ball bearing units being connected together and being connected to a casing;

wherein the screw shaft has a longitudinal axis and each ball bearing unit engages the threads of the screw shaft at a point of engagement, the points of engagement of the ball bearing units being within a common plane of action which is parallel to the longitudinal axis;

wherein the point of engagement of at least one ball bearing unit is disposed 180° opposite to the points of engagement of at least two other ball bearing units, said nut structure being supported against the screw shaft solely by the points of engagement of the ball bearing units;

wherein the outer ring of each of the ball bearing units is fixed to at least one spring bridge which extends crosswise to the screw shaft and which is connected to the casing; and wherein the outer rings of two outer ball bearing units of said nut structure are fixed immovably relative to each other.

* * * * *